(12) United States Patent
Xu et al.

(10) Patent No.: US 11,879,854 B2
(45) Date of Patent: Jan. 23, 2024

(54) POSITIONING OF X-RAY IMAGING SYSTEM USING AN OPTICAL CAMERA

(71) Applicant: Baker Hughes Oilfield Operations LLC, Houston, TX (US)

(72) Inventors: Jing Xu, Shanghai (CN); Li Li, Shanghai (CN); Lisa Ma, Shanghai (CN)

(73) Assignee: Baker Hughes Oilfield Operations LLC, Houston, TX (US)

( * ) Notice: Subject to any disclaimer, the term of this patent is extended or adjusted under 35 U.S.C. 154(b) by 237 days.

(21) Appl. No.: 17/446,291

(22) Filed: Aug. 27, 2021

(65) Prior Publication Data
US 2022/0091048 A1 Mar. 24, 2022

Related U.S. Application Data

(60) Provisional application No. 63/082,178, filed on Sep. 23, 2020.

(51) Int. Cl.
*G01N 23/04* (2018.01)
*G01N 23/083* (2018.01)
(Continued)

(52) U.S. Cl.
CPC .......... *G01N 23/04* (2013.01); *G01N 23/083* (2013.01); *G01N 23/18* (2013.01); *G06F 3/04812* (2013.01); *G06F 3/04842* (2013.01); *G06T 7/60* (2013.01); *G06T 7/80* (2017.01); *G01N 2223/04* (2013.01); *G01N 2223/30* (2013.01);
(Continued)

(58) Field of Classification Search
CPC ...... G01N 23/04; G01N 23/083; G01N 23/18; G01N 2223/30; G01N 2223/303; G01N 2223/323; G01N 2223/40; G06F 3/04812; G06F 3/04842; G06T 7/60; G06T 7/80; G06T 2200/24; G06T 2207/10016
See application file for complete search history.

(56) References Cited

U.S. PATENT DOCUMENTS 7,477,723 B2 1/2009 Kamegawa et al.
9,157,874 B2 10/2015 Tan et al.
(Continued)

FOREIGN PATENT DOCUMENTS

DE 102010018291 B4 12/2018
EP 0974120 A1 1/2000
(Continued)

OTHER PUBLICATIONS

SmartLab. Datasheet [online]. Rigaku Corporation, [retrieved on Apr. 3, 2020]. Retrieved from the Internet: <URL: https://www.rigaku.com/products/xrd/smartlab>.

*Primary Examiner* — Mark R Gaworecki
(74) *Attorney, Agent, or Firm* — Mintz Levin Cohn Ferris Glovsky and Popeo, P.C.

(57) ABSTRACT

In an embodiment, a method of navigational calibration for an x-ray inspection system including an optical camera is provided. The method employs a novel two-dimensional calibration phantom. The calibration phantom can be employed to validate a navigational calibration between positions within camera images and an x-ray beam axis. The calibration phantom can be further employed to identify and compensate for incorrect navigational calibration.

18 Claims, 8 Drawing Sheets

(51) Int. Cl.
   *G01N 23/18*     (2018.01)
   *G06T 7/80*      (2017.01)
   *G06F 3/0484*    (2022.01)
   *G06F 3/0481*    (2022.01)
   *G06F 3/04812*   (2022.01)
   *G06F 3/04842*   (2022.01)
   *G06T 7/60*      (2017.01)

(52) U.S. Cl.
   CPC ...... *G01N 2223/40* (2013.01); *G06T 2200/24* (2013.01); *G06T 2207/10016* (2013.01)

(56) References Cited

U.S. PATENT DOCUMENTS

| | | | |
|---|---|---|---|
| 2018/0267127 A1* | 9/2018 | Geiger | A61B 8/587 |
| 2019/0302039 A1 | 10/2019 | Artemiev et al. | |
| 2020/0004003 A1* | 1/2020 | Omlor | G02B 21/0012 |

FOREIGN PATENT DOCUMENTS

| | | | |
|---|---|---|---|
| JP | 2012147978 A | 8/2012 |
| WO | 2006051690 A1 | 5/2006 |

\* cited by examiner

```
                                              ┌─ 200
                                              │
┌─────────────────────────────────────────────────────────┐
│  Mounting a calibration phantom on a moveable stage,    │
│  wherein a first surface of the calibration phantom is  │
│  generally planar and includes an optically visible     │
│  pattern illustrated thereon,                           │
│                          202                            │
└─────────────────────────────────────────────────────────┘

┌─────────────────────────────────────────────────────────┐
│  Generating a graphical user interface (GUI) including  │
│  a sequence of images of a field of view of an optical  │
│  video camera and a crosshair overlaid upon the         │
│  sequence of images                                     │
│                          204                            │
└─────────────────────────────────────────────────────────┘

┌─────────────────────────────────────────────────────────┐
│  Moving the moveable stage to a first location where    │
│  the template is within the field of view of the video  │
│  camera and the crosshair overlies a center mark of     │
│  the calibration phantom within the GUI,                │
│                          206                            │
└─────────────────────────────────────────────────────────┘

┌─────────────────────────────────────────────────────────┐
│  Determining a calibration ratio defined as a physical  │
│  length distance per pixel within the sequence of       │
│  images image when the moveable stage is at the first   │
│  location,                                              │
│                          210                            │
└─────────────────────────────────────────────────────────┘

┌─────────────────────────────────────────────────────────┐
│  Receiving a physical location of a vertex mark of the  │
│  pattern,                                               │
│                          212                            │
└─────────────────────────────────────────────────────────┘

┌─────────────────────────────────────────────────────────┐
│  Moving the moveable stage from the first position to   │
│  a second position by moving a first offset distance in │
│  a first direction and moving a second offset distance  │
│  in a second direction,                                 │
│                          214                            │
└─────────────────────────────────────────────────────────┘

┌─────────────────────────────────────────────────────────┐
│  Measuring, at the second location, respective first    │
│  pixel differences in the first and second directions   │
│  between a pixel location of the predetermined vertex   │
│  mark within the GUI and a pixel location of a          │
│  crosshair center within the GUI,                       │
│                          216                            │
└─────────────────────────────────────────────────────────┘

┌─────────────────────────────────────────────────────────┐
│  Outputting a calibration status based upon a           │
│  comparison between the first pixel differences in the  │
│  first and second directions and a threshold value,     │
│                          220                            │
└─────────────────────────────────────────────────────────┘

FIG. 2
```

POSITIONING OF X-RAY IMAGING SYSTEM USING AN OPTICAL CAMERA

CROSS-REFERENCE TO RELATED APPLICATIONS

This application claims the benefit of U.S. Provisional Patent Application No. 63/082,178, filed on Sep. 23, 2020 and entitled "Positioning Of X-Ray Imaging System Using An Optical Camera," the entirety of which is incorporated by reference herein.

BACKGROUND

Non-destructive testing (NDT) is a class of analytical techniques that can be used to inspect characteristics of a target, without causing damage, to ensure that the inspected characteristics of the target satisfy required specifications. NDT can be useful in industries that employ structures that are not easily removed from their surroundings (e.g., pipes or welds) or where failures would be catastrophic. For this reason, NDT can be used in a number of industries such as aerospace, power generation, oil and gas transport or refining.

Radiographic testing is an NDT technique that employs x-rays or gamma rays to examine the internal structure of manufactured components for identification of flaws or defects. However, it can be challenging to accurately direct a beam of x-rays generated from an x-ray source to a desired location on the target for inspection.

SUMMARY

To address this problem, x-ray testing systems have been developed that include optical cameras. These systems allow a user to select a position within a field of view of the optical camera and to subsequently move an x-ray source such that the axis of an x-ray beam generated by the x-ray source is located at the selected target positon.

Successful positioning of the x-ray source in this manner requires knowledge of an in-plane offset between any position within the field of view of the optical camera and the x-ray beam axis. Such knowledge can be obtained by a calibration procedure. However, the calibration of existing x-ray testing systems can be prone to error. As an example, existing x-ray testing systems can employ a single reference marker for calibration. With only a single point of reference for calibration, it can be difficult to identify when calibration errors occur. Thus, calibration errors can go undetected, compromising the accuracy of x-ray inspection data.

In an embodiment, a method of navigational calibration for an x-ray inspection system is provided. The method can include mounting a calibration phantom on a moveable stage. A first surface of the calibration phantom can be generally planar and it can include an optically visible pattern illustrated thereon. The pattern can include a plurality of polygons of different sizes, wherein a first polygon of the plurality of polygons is inset and centered within a second polygon of the plurality of polygons. The pattern can also include a center mark at a center of the calibration phantom. The pattern can further include a vertex mark at a vertex of one of the plurality of polygons. A physical location of the vertex mark can be offset from a physical location of the center mark by a predetermined first offset distance in a first direction and a predetermined second offset distance in a second direction. The first and second directions can lie in the plane of the first surface and they can be orthogonal to one another. The method can also include displaying, within a graphical user interface (GUI), a sequence of images of a field of view of an optical video camera and a crosshair overlaid upon the sequence of images. The method can additionally include moving the moveable stage to a first location. The calibration phantom can be within the field of view of the video camera such that the crosshair center is aligned with the center mark within the GUI. The method can additionally include determining a calibration ratio defined as a physical distance per pixel within the sequence of images when the moveable stage is at the first location. The method can also include receiving the physical location of the vertex mark. The method can further include moving the moveable stage from the first position to a second position by moving the first offset distance in the first direction and moving the second offset distance in the second direction. The method can additionally include measuring, at the second location, respective first pixel differences in the first and second directions between a pixel location of the predetermined vertex mark within the GUI and a pixel location of the crosshair center within the GUI. The method can also include outputting a calibration status based upon a comparison between the first pixel differences in the first and second directions and a threshold value.

In another embodiment, determining the calibration ratio can include receiving a physical length of a predetermined side of one of the first and second polygons, measuring a number pixels over which the predetermined side extends within the GUI, and taking the ratio of the physical length of the predetermined side and the measured number of pixels.

In another embodiment, the method can also include annunciating a first notification representing a successful calibration status when the first pixel differences are each less than or equal to the threshold value.

In another embodiment, the optical axis of the field of view of the video camera can approximately intersect the pixel location of the crosshair within the GUI when the first pixel differences are each less than or equal to the threshold value.

In another embodiment, the method can also include removing the calibration phantom from the movable stage. The method can further include mounting a target object to the moveable stage. The method can additionally include moving the movable stage such that at least a portion of the target object is within the field of view of the video camera. The method can also include receiving, within the GUI, a user selection of an inspection location within the field of view that is on the target object. The method can further include measuring respective second pixel differences in the first and second directions between a pixel location of the inspection location within the GUI and a pixel location of the crosshair center within the GUI. The method can additionally include determining a first physical offset distance in the first and second directions between the selected inspection location and the optical axis of the video camera based upon the second pixel differences and the calibration ratio. The method can further include receiving a second physical offset distance in the first and second directions between the optical axis of the video camera and a beam axis of an x-ray beam emitted by an x-ray source positioned adjacent to the video camera. The method can also include moving the movable stage to a third position based upon the first and second physical offset distances, wherein the beam axis of the x-ray source intersects the selected inspection location on the target object in the third position.

In another embodiment, the method can also include annunciating a second notification representing a failed calibration status when at least one of the first pixel differences is greater than the threshold value.

In another embodiment, the optical axis of the field of view of the video camera does not intersect the pixel location of the crosshair within the GUI when at least one of the first pixel differences is greater than the threshold value.

In another embodiment, the method can also include determining respective correction factors in the first and second directions when the first pixel differences are greater than the threshold value, wherein the correction factors are respective fourth pixel differences in the first and second directions between the pixel location of the crosshair center and the pixel location of the vertex mark.

In another embodiment, the method can also include removing the calibration phantom from the movable stage. The method can further include mounting a target object to the moveable stage. The method can additionally include moving the movable stage to a position such that at least a portion of the target object is within the field of view of the video camera. The method can further include receiving, within the GUI, a user selection of an inspection location within the field of view that is on the target object. The method can also include measuring respective second pixel differences in the first and second directions between a pixel location of the inspection location within the GUI and a pixel location of the crosshair center within the GUI. The method can additionally include determining a first physical offset distance in the first and second directions between the selected inspection location and the optical axis of the video camera based upon the second pixel differences and the calibration ratio. The method can further include receiving a second physical offset distance in the first and second directions between the optical axis of the video camera and a beam axis of an x-ray beam emitted by an x-ray source positioned adjacent to the video camera. The method can also include receiving the correction factors in the first and second directions. The method can additionally include moving the movable stage to a third position based upon the first and second physical offset distances and the correction factors, wherein the location of the beam axis of the x-ray source intersects the selected location on the target object.

In an embodiment, a computer program product including a non-transitory machine-readable medium is provided. The machine-readable medium can store instructions that, when executed by at least one programmable processor, cause the at least one programmable processor to perform a variety of operations. The operations can include generating a graphical user interface (GUI) including a sequence of images of a field of view of an optical video camera and a crosshair overlaid upon the sequence of images, outputting the GUI for display, and moving the moveable stage to a first location. A calibration phantom can be within the field of view of the video camera, where a first surface of the calibration phantom can be generally planar and includes an optically visible pattern illustrated thereon. The pattern can include a plurality of polygons of different sizes. A first polygon of the plurality of polygons can be inset and centered within a second polygon of the plurality of polygons. The pattern can also include a center mark at a center of the calibration phantom. The pattern can further include a vertex mark at a vertex of one of the plurality of polygons. A physical location of the vertex mark can be offset from a physical location of the center mark by a predetermined first offset distance in a first direction and a predetermined second offset distance in a second direction and the first and second directions can lie in the plane of the first surface and can be orthogonal to one another. The crosshair center can be aligned with the center mark within the GUI at the first position. The operations can further include determining a calibration ratio defined as a physical distance per pixel within the sequence of images when the moveable stage is at the first location. The operations can additionally include receiving the physical location of the vertex mark. The operations can also include moving the moveable stage from the first position to a second position by moving the first offset distance in the first direction and moving the second offset distance in the second direction. The operations can further include measuring, at the second location, respective first pixel differences in the first and second directions between a pixel location of the predetermined vertex mark within the GUI and a pixel location of the crosshair center within the GUI. The operations can additionally include outputting a calibration status based upon a comparison between the first pixel differences in the first and second directions and a threshold value.

In another embodiment, determining the calibration ratio can include receiving a physical length of a predetermined side of one of the first and second polygons, measuring a number pixels over which the predetermined side extends within the GUI, and taking the ratio of the physical length of the predetermined side and the measured number of pixels.

In another embodiment, the at least one programmable processor can be further configured to perform operations including annunciating a first notification representing a successful calibration status when the first pixel differences are each less than or equal to the threshold value.

In another embodiment, the optical axis of the field of view of the video camera can approximately intersecs the pixel location of the crosshair within the GUI when the first pixel differences are each less than or equal to the threshold value.

In another embodiment, the at least one programmable processor can be further configured to perform operations include moving the movable stage after calibration phantom is removed from the moveable stage and a target object is mounted to the moveable stage. The moveable stage can be moved to a position such that at least a portion of the target object to be within the field of view of the video camera. The operations can further include receiving, within the GUI, a user selection of an inspection location within the field of view that is on the target object. The operations can additionally include measuring respective second pixel differences in the first and second directions between a pixel location of the inspection location within the GUI and a pixel location of the crosshair center within the GUI. The operations can also include determining a first physical offset distance in the first and second directions between the selected inspection location and the optical axis of the video camera based upon the second pixel differences and the calibration ratio. The operations can also include receiving a second physical offset distance in the first and second directions between the optical axis of the video camera and a beam axis of an x-ray beam emitted by an x-ray source positioned adjacent to the video camera. The operations can further include moving the movable stage to a third position based upon the first and second physical offset distances. The beam axis of the x-ray source can intersect the selected inspection location on the target object in the third position.

In another embodiment, the at least one programmable processor canbe further configured to perform operations including annunciating a second notification representing a failed calibration status when at least one of the first pixel differences is greater than the threshold value.

In another embodiment, the optical axis of the field of view of the video camera does not intersect the pixel location of the crosshair within the GUI when at least one of the first pixel differences is greater than the threshold value.

In another embodiment, the at least one programmable processor can be further configured to perform operations including determining respective correction factors in the first and second directions when the first pixel differences are greater than the threshold value. The correction factors can be respective fourth pixel differences in the first and second directions between the pixel location of the crosshair center and the pixel location of the vertex mark.

In another embodiment, the at least one programmable processor can be further configured to perform operations including moving the movable stage after the calibration phantom is removed from the moveable stage and a target object is mounted to the moveable stage. The moveable stage can be moved to a position such that at least a portion of the target object is within the field of view of the video camera. The operations can further include receiving, within the GUI, a user selection of an inspection location within the field of view that is on the target object. The operations can additionally include measuring respective second pixel differences in the first and second directions between a pixel location of the inspection location within the GUI and a pixel location of the crosshair center within the GUI. The operations can also include determining a first physical offset distance in the first and second directions between the selected inspection location and the optical axis of the video camera based upon the second pixel differences and the calibration ratio. The operations can further include receiving a second physical offset distance in the first and second directions between the optical axis of the video camera and a beam axis of an x-ray beam emitted by an x-ray source positioned adjacent to the video camera. The operations can additionally include receiving the correction factors in the first and second directions. The operations can also include moving the movable stage to a third position based upon the first and second physical offset distances and the correction factors. The location of the beam axis of the x-ray source can intersect the selected location on the target object.

DESCRIPTION OF DRAWINGS

These and other features will be more readily understood from the following detailed description taken in conjunction with the accompanying drawings, in which:

FIG. 2 is a flow diagram illustrating one exemplary embodiment of a method for verifying the status of the navigation calibration of the x-ray inspection system of FIG. 1;

It is noted that the drawings are not necessarily to scale. The drawings are intended to depict only typical aspects of the subject matter disclosed herein, and therefore should not be considered as limiting the scope of the disclosure.

DETAILED DESCRIPTION

X-ray inspection systems can be used to examine the interior of a structure to identify flaws that are not apparent from the surface. To facilitate inspection, x-ray testing systems have been developed that include optical cameras. These systems allow a user to view a target object within the field of view of the camera, select a position on the target object, and subsequently move the target such that an x-ray beam generated by the x-ray source intersects the selected target positon. In order to accurately move the target object, a calibration is needed to convert between distances within the camera images and physical distances. Notably however, presently developed calibration techniques can employ a single reference marker. With only a single point of reference for calibration, it can be difficult to identify when calibration errors occur. Embodiments of the present disclosure provide an improved calibration technique that employs a novel two-dimensional calibration phantom. The calibration phantom can be employed to validate a navigational calibration between positions within camera images and an x-ray beam axis. The calibration phantom can be further employed to identify and compensate for incorrect navigational calibration.

Embodiments of systems and corresponding methods for navigational calibration are discussed herein in the context of an x-ray inspection system. It can be understood, however, that the disclosed embodiments can be employed for navigation calibration of other systems without limit.

Figure 1A:
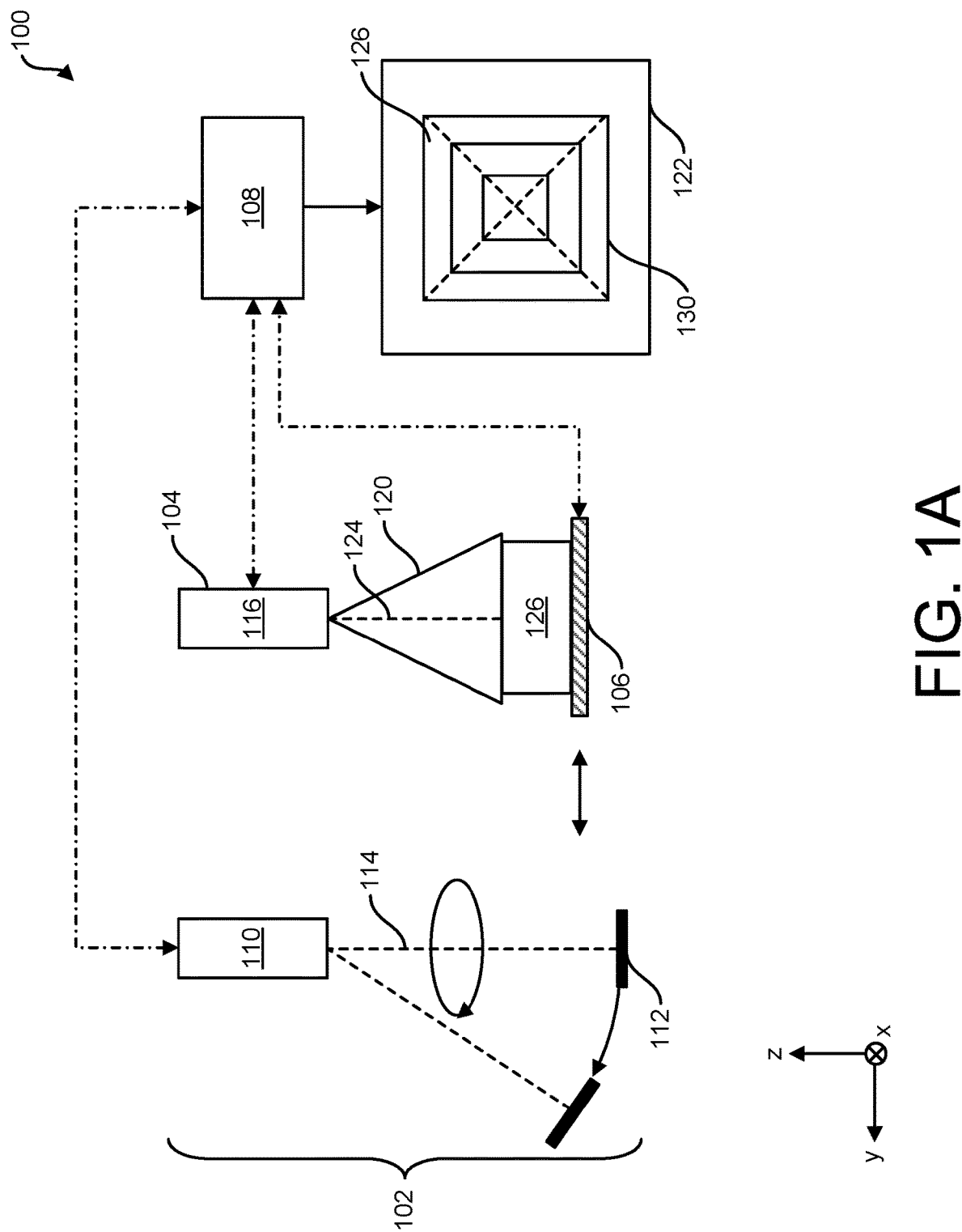
FIG. 1A is a schematic diagram illustrating one exemplary embodiment of an x-ray inspection system including an x-ray testing sub-system, a video sub-system, and a moveable stage configured to move therebetween.
Figure 1B:
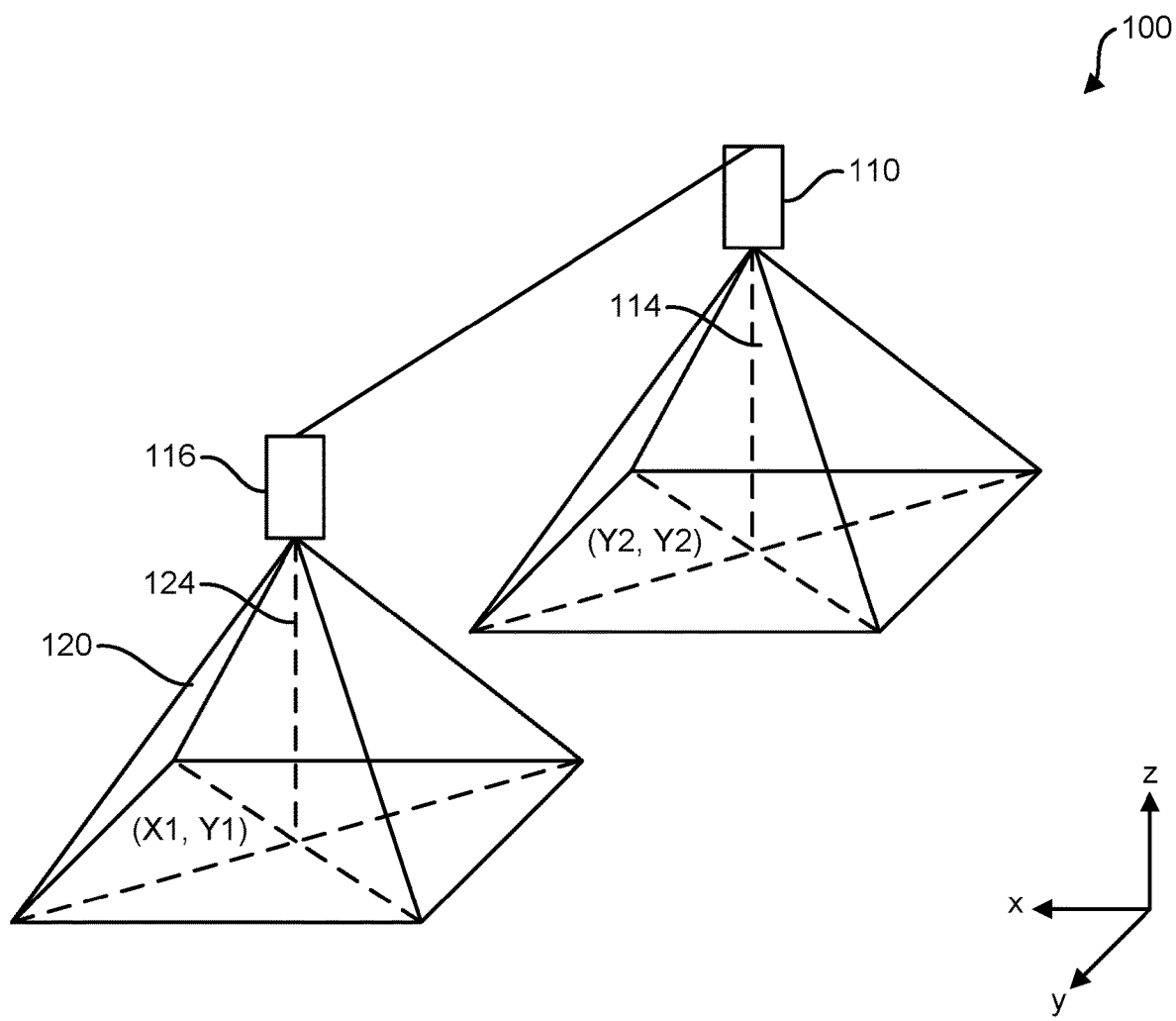
FIG. 1B is a perspective view of a schematic diagram illustrating a portion of the x-ray inspection system of FIG. 1.
Figure 1C:
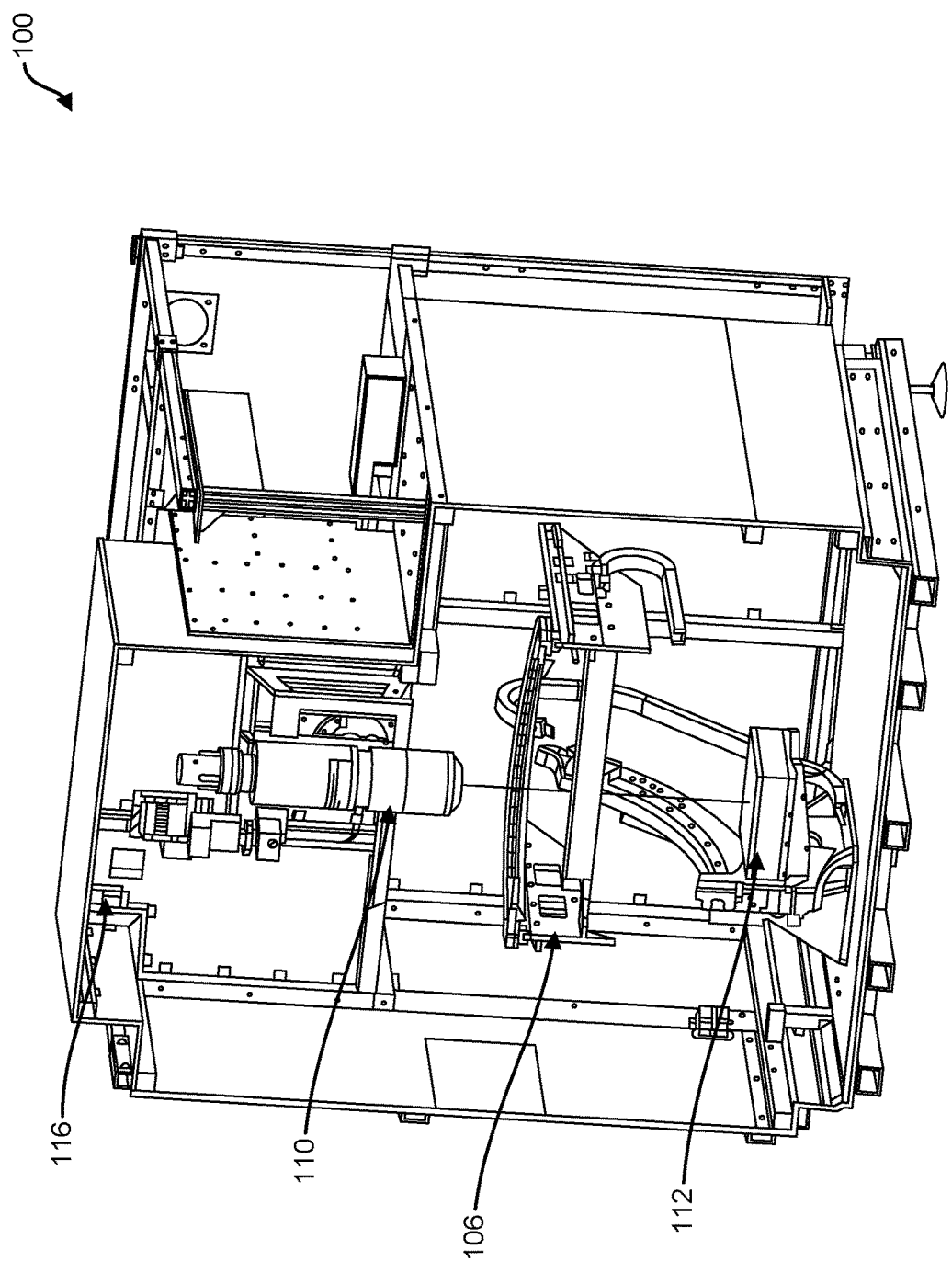
FIG. 1C is a perspective view of the x-ray inspection system of FIG. 1A.

FIG. 1A is a schematic diagram illustrating of one exemplary embodiment of an x-ray inspection system 100 including an x-ray testing sub-system 102, a video sub-system 104, a moveable stage 106 configured to move therebetween, and a controller 108. FIG. 1B is a schematic, perspective view diagram of the x-ray inspection system 100. FIG. 1C is diagram presenting a front-facing perspective view of the x-ray inspection system 100 of FIG. 1A in greater detail.

The x-ray testing sub-system 102 can include an x-ray source 110 and an x-ray detector 112 in communication with the controller 108. In response to commands from the controller 108, the x-ray source 110 can be emit an x-ray beam along an x-ray beam axis 114. The x-ray detector 112 can measure incident x-ray intensity as a function of position and transmit this data to the controller 108. The acquired x-ray inspection data can be further displayed within a graphical user interface 122 by a display device in communication with the controller 108.

The video sub-system 104 can include an optical video camera 116 configured to acquire a sequence of images within a field of view 120 for display within a graphical user interface 122 by a display device. In certain embodiments, the field of view 120 can be conic, tapering from a base to a vertex. The base can adopt any desired shape (e.g., circular, square, rectangular, etc.) and can represent a focal plane of the video camera 116. An optical axis 124 of the video camera 116 can be oriented approximately perpendicular to the focal plane. The GUI 122 can further overlay a crosshair at the location of the optical axis 124.

The x-ray source 110 and the video camera 116 can be rigidly mounted adjacent to one another. That is, the x-ray source 110 and the video camera 116 can maintain a fixed position with respect to one another. As a result, the x-ray beam axis 114 and the optical axis 124 can be approximately parallel to one another (e.g., extending in the z-direction). Thus, the x-ray beam axis 114 and the optical axis 124 are laterally offset from one another within a plane (e.g., an x-y plane) extending perpendicular to the beam axes 114, 124 by known, fixed distances in the x-direction and the y-direction.

In certain embodiments, the x-ray inspection system 100 can be a five-axis imaging system. That is, the moveable stage 106 has five degrees of freedom of motion. As an example, the moveable stage 106 can translate in three orthogonal directions (x, y, z), as well as rotate about two of the three translation axes (e.g., rotation about the x-axis and the z-axis). Movements of the moveable stage 106 can be performed in one or more of the five directions, in any combination, in response to commands from the controller 108.

During x-ray inspection, it can be desirable to allow a user to select the location on a target object where x-ray inspection is to be performed using optical images displayed within the GUI 122. That is, allowing the user to select a position of interest on the target object within the GUI 122 and, in response, command the moveable stage 106 to move the target object from the field of view 120 of the video camera 116 such that the x-ray beam axis 114 intersects the selected position. However, such positioning requires a navigational calibration to convert between distances within the GUI 122 and physical distances so that appropriate commands can be generated by the controller 108 and transmitted to the moveable stage 106 to effect movement.

Navigational calibration of the x-ray inspection system 100 can be performed using a novel two-dimensional calibration phantom 126. As discussed in greater detail below, the calibration phantom 126 can have a generally planar surface that includes an optically visible pattern 130 illustrated thereon, where physical distances between selected features of the pattern 130 are known. In a setup mode, digital images of the pattern 130 can be acquired by the video camera 116 and used to determine a calibration ratio of the physical distance per pixel within the digital images. Subsequently, the calibration ratio can be used to move the calibration phantom 126 to a target location with respect to the optical axis 124 (e.g., the crosshair of the GUI 122). If the target location is aligned with the optical axis 124, the navigational calibration can be considered correct or validated. However, if the target location is not aligned with the optical axis 124, the navigational calibration can be considered incorrect or un-validated. In this latter case, a correction factor can be further determined to correct the navigational calibration.

FIG. 2 is a flow diagram illustrating one exemplary embodiment of a method 200 for navigational calibration of the x-ray inspection system 100. As shown, the method 200 includes operations 202-220. However, alternative embodiments of the method can include greater or fewer operations and the operations can be performed in a different order than illustrated in FIG. 2.

Figure 3:
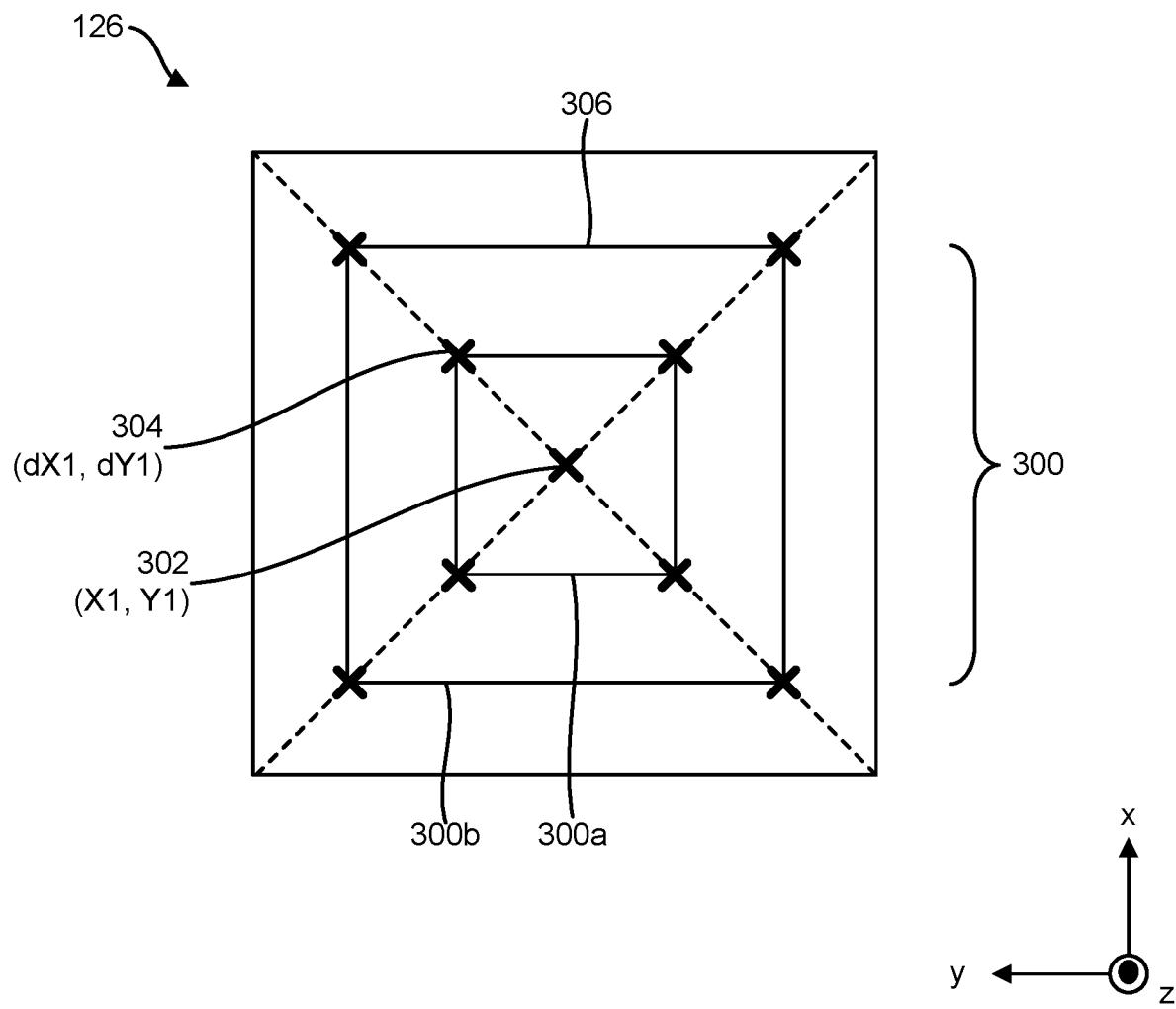
FIG. 3 is a schematic diagram illustrating a calibration phantom employed to calibrate navigation of the moveable stage between the video camera and the x-ray source.

In operation 202, the calibration phantom 126 is mounted to the moveable stage 106. FIG. 3 is a schematic diagram illustrating one exemplary embodiment of the calibration phantom 126. The calibration phantom 126 can have a generally planar surface that includes the optically visible pattern 130 illustrated thereon.

The pattern 130 can include a plurality of polygons 300 having different sizes, a center mark 302 designating the center of the calibration phantom 126, and one or more markings 304 designating respective polygon vertices. As an example, the plurality of polygons 300 can include a first polygon 300a and a second polygon 300b. The first polygon 300a can be inset and centered within the second polygon 300b. For the purpose of illustration, the first and second polygons 300a, 300b are shown in FIG. 3 as squares. However, it can be understood that the plurality of polygons can take the form of any type of polygon without limit.

As shown, the physical location of respective vertex marks 304 of the polygons 300 are offset from the physical location of the center mark 302. Maintaining the coordinate system illustrated in FIG. 1A, the surface of the calibration phantom 126 lies in the x-y plane (first and second orthogonal directions). Accordingly, assuming the center mark 302 is physically located at physical coordinates X1,Y1, the illustrated vertex 304 is offset by from the center mark 302 by physical distances dX1,dY1. That is, the coordinates of the vertex 304 are X1+dX1,Y1+dY1.

The dimensions of the polygons 300 (e.g., side length), as well as the physical distance between the center of the calibration phantom 126 (center mark 302) and each of the vertices of the first and second polygons 300a, 300b is known. However, prior to calibration, the calibration ratio of the physical distance represented per pixel within the GUI 122 is not known. Accordingly, the calibration ratio can be determined in operations 204-210

Figure 4:
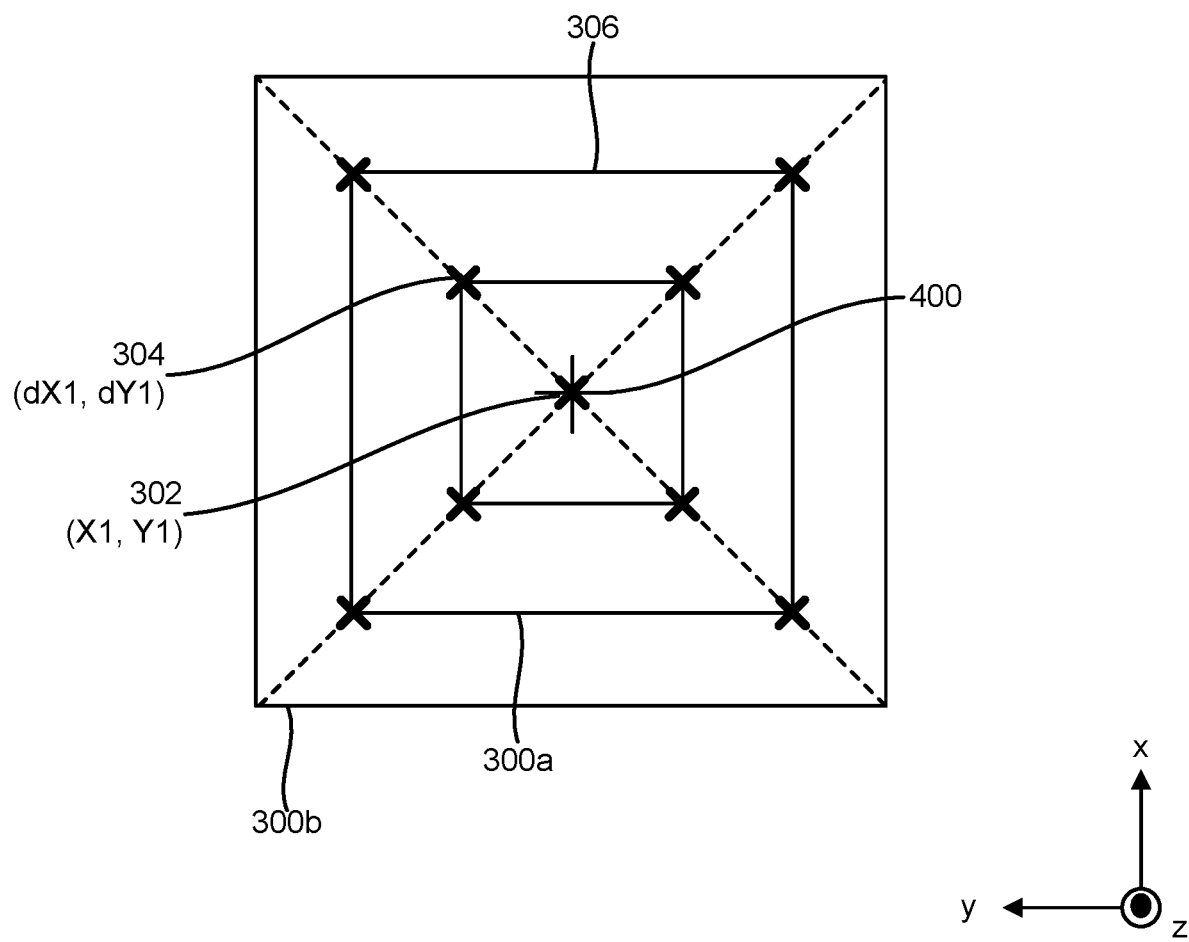
FIG. 4 is a schematic diagram illustrating an image of the calibration phantom of FIG. 2 within a graphical user interface (GUI) including a crosshair.

In operation 204, a sequence of images can be acquired by the video camera 116 and output to the controller 108. The controller 108 can further generate the GUI 122 including the a crosshair 400 overlaid upon the optical images of the calibration phantom 126. Thus, as shown in FIG. 4, the GUI 122 can include the sequence of images of the field of view 120 of the video camera 116 (e.g., the calibration phantom 126) and the crosshair 400 overlaid upon the sequence of images. The controller 108 can additional output the GUI 122 (e.g., to a display device) for display of the GUI 122.

In operation 206, the moveable stage 106 can be moved to a first location. At the first location, the crosshair 400 can be aligned (e.g., positioned approximately on top of) the center mark 302 within the GUI 122. The physical location X1,Y1 can be recorded as a point of reference.

In operation 210, the calibration ratio of physical length per pixel within the sequence of images can be determined. As noted above, the physical dimensions of each of the plurality of polygons within the calibration phantom 126 are known. These dimensions can be provided to the controller 108 via user input and/or retrieved from a memory of the controller 108 (e.g., read from a configuration file). Accordingly, the controller 108 can receive the physical dimensions of a selected polygon side 306. Within the GUI 122, the number of pixels over which the physical length that polygon side 306 extends can be measured. As an example, such measurement can be made manually by a user employing image analysis tools or by the controller 108 employing computer vision algorithms. The calibration ratio can be subsequently determined from the ratio of the received physical dimension (e.g., length) of the selected polygon side 306 and the measured number of pixels.

It can be desirable to check the ability of the moveable stage 106 to move the calibration phantom 126 to a selected location within the GUI 122. In general, if the moveable stage 106 can move the calibration phantom 126 to a selected location within the GUI 122, the navigation calibration can be considered successful. However, if the moveable stage 106 cannot move the calibration phantom 126 to the selected location within the GUI 122, the navigation calibration can be considered to fail and require further correction. This check is performed in operations 212-220.

In operation 212, the physical location of one or more of the vertex marks 304 can be received. As noted above, the physical dimensions of the polygons 300 are known. That is, the offset distance dX1 in the x-direction and the offset distance dY1 in the y-direction between the center mark 302 and each of the vertices 304 of the polygons 300 is known. Thus, once the physical location X1,Y1 of the center mark 302 is established, the physical location of each vertex is known and given by X1+dX1,Y1+dY1.

In operation 214, the user can select one of the vertices 304 within the GUI 122. In response to the selection, the moveable stage 106 can move from the first position (e.g., where the center mark 302 is aligned with the crosshair 400) to a second position. The second position can be adopted by moving the moveable stage 106 by the first offset distance in the first direction (e.g., dX1) and the second offset distance in the second direction (e.g., dY1). That is, the moveable stage 106 is commanded (e.g., by the controller 108) to move such that the crosshair 400 is aligned with the selected vertex 304.

This goal can be accomplished if the navigation calibration is correct. However, a variety of factors can cause calibration errors. Examples can include, but are not limited to, movement of the video camera 116 from its mounting position, errors in movement of the moveable stage, etc.

According, a check can be performed in operation 216, to determine whether the crosshair 400 is aligned with the selected vertex 304 in the second position. As an example, when the moveable stage 106 is at the second position, the pixel difference in first and second directions (e.g., orthogonal directions in the plane of the calibration phantom 126; the x- and y-directions) between the pixel location of the center of the crosshair 400 and the pixel location of the vertex 304 can be measured within the GUI 122 by the controller 108.

In operation 220, a calibration status can be output by the controller 108 based upon a comparison between the first pixel differences in the first and second directions and a threshold value. The threshold value can be input by the user and received by the controller 108 or retrieved by the controller 108 from a configuration file. In further embodiments, the calibration status can be received by a display device for viewing by the user.

Figure 5:
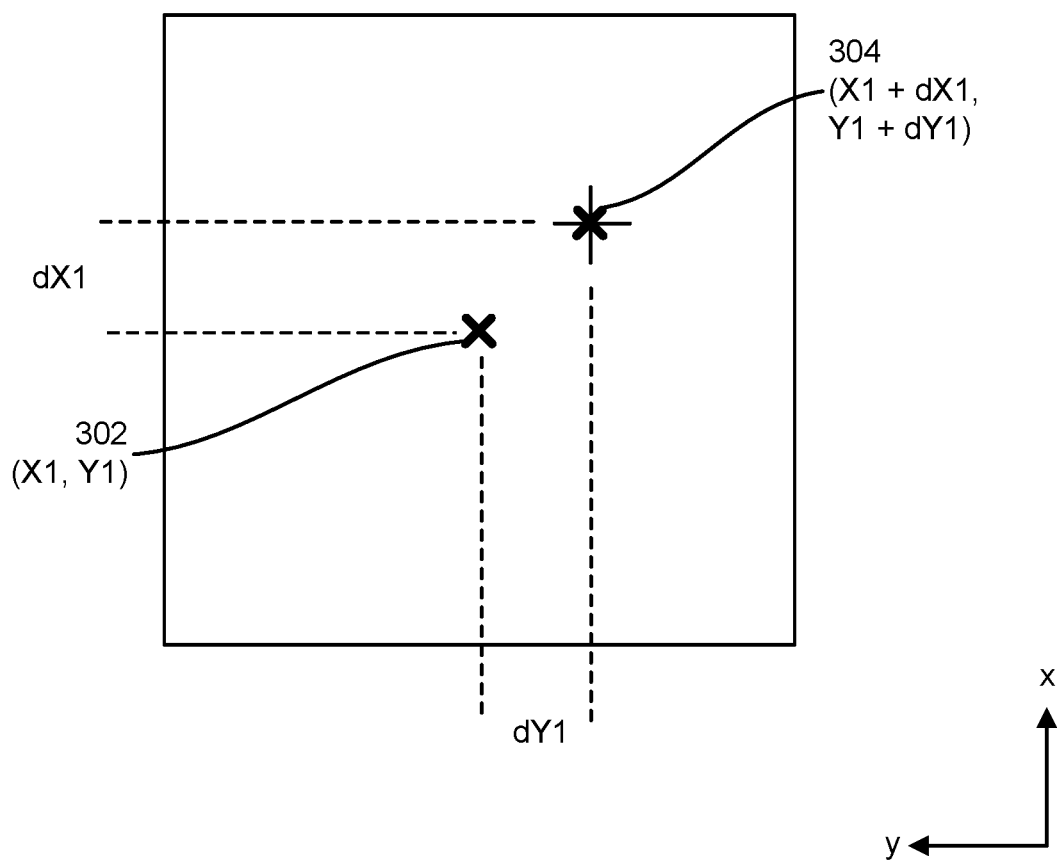
FIG. 5 is a schematic diagram illustrating a relative position of the GUI crosshair after movement of the calibration phantom by the movement stage during a navigation calibration operation; the crosshair is aligned with a selected vertex of one of a plurality of polygons illustrated on the calibration phantom, indicating that navigation of the movement stage between the navigation calibration sub-system and the inspection system is properly calibrated.

A first notification, representing a validated or successful calibration, can be annunciated when the first pixel differences are each less than or equal to the threshold value. The annunciation can take the form of one or more of a display within the GUI 122 (e.g., alpha-numeric text, symbols, etc.), sounds, activation of one or more lights, and combinations thereof. Under these circumstances, the optical axis 124 of the field of view 120 of the video camera 116 approximately intersects the pixel location of the crosshair 400 within the GUI 122. This condition is illustrated in FIG. 5.

The calibration phantom 126 can further include a second pattern that is located beneath the first, outer surface. This second pattern can be approximately the same as the first pattern, except that it is visible in x-ray but not optically. As noted above, the x-ray detector 112 can be further configured to output a series of images that characterize intensity of x-ray radiation received as a function of position within the plane of the detector. Thus, images of the second pattern can be displayed within the GUI 122 when the calibration phantom is positioned within a field of view of the x-ray beam. When the x-ray images are displayed within the GUI 122, the crosshair 400 can be aligned with the x-ray beam axis 114. To determine the physical location of the x-ray beam, the moveable stage 106 can be moved such that the center mark of the second calibration pattern is aligned with the crosshair 400. This position can be recorded as for reference as X2,Y2.

Once the navigation calibration has been validated, it can be employed for inspection of a target object. As an example, the calibration phantom 126 can be removed from the moveable stage 106 and the target object can be mounted to the moveable stage 106. The position of the moveable stage 106 can be further adjusted such that at least a portion of the target object is visible within the field of view 120 of the video camera 116. Once the target object is positioned, the user can select an inspection location on the target object within the GUI 122.

In response to the user selection, the controller 108 can determine the physical distance between the crosshair 400 and the inspection location. As an example, respective second pixel differences can be measured in the first and second directions between the pixel location of the inspection location and the center of the crosshair 400. First physical offset distances in the first and second directions between the selected inspection location and the optical axis of the camera (e.g., the center of the crosshair 400) can be determined from the second pixel differences and the calibration ratio.

The controller 108 can also determine second physical offset distances in the first and second directions between the optical axis 124 of the video camera 116 and the x-ray beam axis 114. As noted above, the reference positions X1,Y1 and X2,Y2 can be established using the calibration phantom 126. Thus, the second physical offset distances can be received by the controller 108 via user input, read from a configuration file, or calculated directly from X1,Y1 and X2,Y2.

The moveable stage 106 can be commanded to move to a third position based upon the first and second physical distances. That is, because the first physical distances provide the offset between the optical axis 124 and the inspection location and the second physical distances provide the offset between the optical axis 124 and the x-ray beam axis 114, moving the moveable stage 106 according to the first and second physical distances results in the x-ray beam axis 114 being aligned with (e.g., intersecting) the inspection location.

A second notification, representing a failed or unsuccessful calibration, can be annunciated when the first pixel differences are each greater than the threshold value. The annunciation can take the form of one or more of a display within the GUI 122 (e.g., alpha-numeric text, symbols, etc.), sounds, activation of a light, and combinations thereof. Under these circumstances, the optical axis 124 of the field of view 120 of the video camera 116 does not intersect the pixel location of the crosshair 400 within the GUI 122. This condition is illustrated in FIG. 6.

Figure 6:
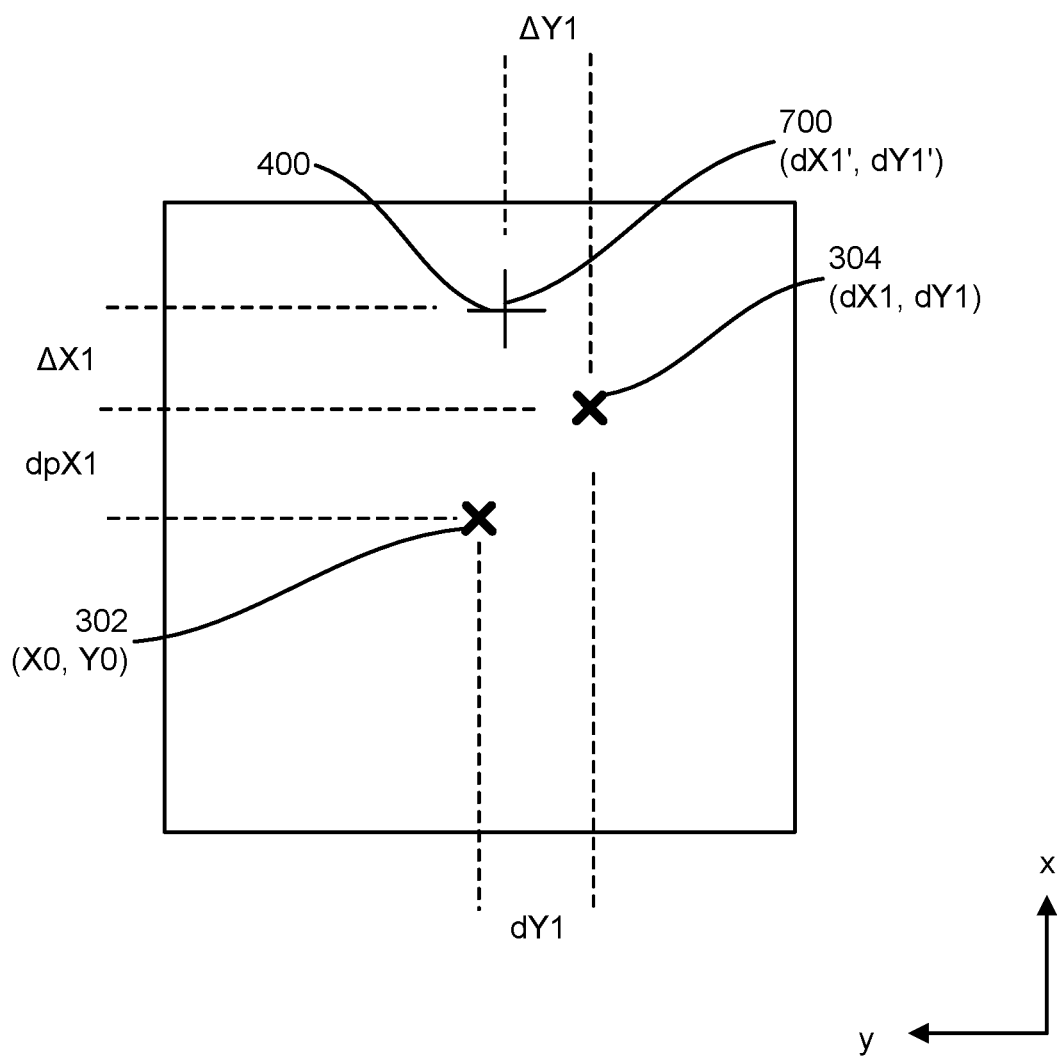
FIG. 6 is a schematic diagram illustrating a relative position of the GUI crosshair after movement of the calibration phantom by the movement stage during a navigation calibration operation; the crosshair is mis-aligned with the selected vertex, indicating that compensation of the navigation calibration of the x-ray inspection system is required.

As shown in FIG. 6, the actual coordinates 700 of the crosshair 400 are displaced from the center mark 302 by dX1', dX1', as compared to the coordinates of the vertex 304, which are dX1', dX1'. That is, the actual coordinates 700 of the crosshair 400 are displaced from the coordinates of the vertex 304 by ΔX1,ΔY1.

Accordingly, correction factors in the first and second directions (e.g., ΔX1,ΔY1) can be determined when the first pixel differences are greater than the threshold value. These correction factors can be fourth pixel differences in the first and second directions between the pixel location of the center of the crosshair 400 and the pixel location of the vertex mark 304.

Subsequently, the correction factor can be used to compensate for errors in positioning. As an example, when receiving a command to move to location X1+dX1, Y1+dY1, the controller 108 will apply the correction factor and output commands to the moveable stage 106 to move to X1+dX1+ΔX1, Y1+dY1+ΔY1 to compensate.

Exemplary technical effects of the methods, systems, and devices described herein include, by way of non-limiting example improved navigational accuracy during x-ray inspection of a target object. A navigation calibration is provided that permits a user to select a location within an optical image of a target and to move the target object such that an axis of an x-ray beam is aligned with the selected location. The navigation calibration can further identify calibration errors and determine correction factors that compensate for the calibration errors.

Certain exemplary embodiments have been described to provide an overall understanding of the principles of the structure, function, manufacture, and use of the systems, devices, and methods disclosed herein. One or more examples of these embodiments have been illustrated in the accompanying drawings. Those skilled in the art will understand that the systems, devices, and methods specifically described herein and illustrated in the accompanying drawings are non-limiting exemplary embodiments and that the scope of the present invention is defined solely by the claims. The features illustrated or described in connection with one exemplary embodiment may be combined with the features of other embodiments. Such modifications and variations are intended to be included within the scope of the present invention. Further, in the present disclosure, like-named components of the embodiments generally have similar features, and thus within a particular embodiment each feature of each like-named component is not necessarily fully elaborated upon.

The subject matter described herein can be implemented in analog electronic circuitry, digital electronic circuitry, and/or in computer software, firmware, or hardware, including the structural means disclosed in this specification and structural equivalents thereof, or in combinations of them. The subject matter described herein can be implemented as one or more computer program products, such as one or more computer programs tangibly embodied in an information carrier (e.g., in a machine-readable storage device), or embodied in a propagated signal, for execution by, or to control the operation of, data processing apparatus (e.g., a programmable processor, a computer, or multiple computers). A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub-programs, or portions of code). A computer program can be deployed to be executed on one computer or on multiple computers at one site or distributed across multiple sites and interconnected by a communication network.

The processes and logic flows described in this specification, including the method steps of the subject matter described herein, can be performed by one or more programmable processors executing one or more computer programs to perform functions of the subject matter described herein by operating on input data and generating output. The processes and logic flows can also be performed by, and apparatus of the subject matter described herein can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processor of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, (e.g., EPROM, EEPROM, and flash memory devices); magnetic disks, (e.g., internal hard disks or removable disks); magneto-optical disks; and optical disks (e.g., CD and DVD disks). The processor and the memory can be supplemented by, or incorporated in, special purpose logic circuitry.

To provide for interaction with a user, the subject matter described herein can be implemented on a computer having a display device, e.g., a CRT (cathode ray tube) or LCD (liquid crystal display) monitor, for displaying information to the user and a keyboard and a pointing device, (e.g., a mouse or a trackball), by which the user can provide input to the computer. Other kinds of devices can be used to provide for interaction with a user as well. For example, feedback provided to the user can be any form of sensory feedback, (e.g., visual feedback, auditory feedback, or tactile feedback), and input from the user can be received in any form, including acoustic, speech, or tactile input.

The techniques described herein can be implemented using one or more modules. As used herein, the term "module" refers to computing software, firmware, hardware, and/or various combinations thereof. At a minimum, however, modules are not to be interpreted as software that is not implemented on hardware, firmware, or recorded on a non-transitory processor readable recordable storage medium (i.e., modules are not software per se). Indeed "module" is to be interpreted to always include at least some physical, non-transitory hardware such as a part of a processor or computer. Two different modules can share the same physical hardware (e.g., two different modules can use the same processor and network interface). The modules described herein can be combined, integrated, separated, and/or duplicated to support various applications. Also, a function described herein as being performed at a particular module can be performed at one or more other modules and/or by one or more other devices instead of or in addition to the function performed at the particular module. Further, the modules can be implemented across multiple devices and/or other components local or remote to one another. Additionally, the modules can be moved from one device and added to another device, and/or can be included in both devices.

The subject matter described herein can be implemented in a computing system that includes a back-end component (e.g., a data server), a middleware component (e.g., an application server), or a front-end component (e.g., a client computer having a graphical user interface or a web browser through which a user can interact with an implementation of the subject matter described herein), or any combination of such back-end, middleware, and front-end components. The components of the system can be interconnected by any form or medium of digital data communication, e.g., a communication network. Examples of communication networks include a local area network ("LAN") and a wide area network ("WAN"), e.g., the Internet.

In the descriptions herein and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." In addition, use of the term "based on," above and in the claims is intended to mean, "based at least in part on," such that an unrecited feature or element is also permissible.

As used in the description herein and throughout the claims that follow, the meaning of "a," "an," and "the" includes plural reference unless the context clearly dictates otherwise.

Approximating language, as used herein throughout the specification and claims, may be applied to modify any quantitative representation that could permissibly vary without resulting in a change in the basic function to which it is related. "Approximately," "substantially, "about," and generally can include numbers that fall within a range of 1%, or in some embodiments within a range of 5% of a number, or in some embodiments within a range of 10% of a number in either direction (greater than or less than the number) unless otherwise stated or otherwise evident from the context (except where such number would impermissibly exceed 100% of a possible value). Accordingly, a value modified by a term or terms, such as "about," "approximately," "substantially," and generally are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

One skilled in the art will appreciate further features and advantages of the invention based on the above-described embodiments. Accordingly, the present application is not to be limited by what has been particularly shown and described, except as indicated by the appended claims. All publications and references cited herein are expressly incorporated by reference in their entirety.

The invention claimed is:

1. A method of navigational calibration for an x-ray inspection system, comprising:
    mounting a calibration phantom on a moveable stage, wherein a first surface of the calibration phantom is generally planar and includes an optically visible pattern illustrated thereon, the pattern including:
        a plurality of polygons of different sizes, wherein a first polygon of the plurality of polygons is inset and centered within a second polygon of the plurality of polygons;
        a center mark at a center of the calibration phantom; and
        a vertex mark at a vertex of one of the plurality of polygons;
        wherein a physical location of the vertex mark is offset from a physical location of the center mark by a predetermined first offset distance in a first direction and a predetermined second offset distance in a second direction, and wherein the first and second directions lie in the plane of the first surface and are orthogonal to one another;
    generating a graphical user interface (GUI) including a sequence of images of a field of view of an optical video camera and a crosshair overlaid upon the sequence of images;
    outputting the GUI for display;
    moving the moveable stage to a first location, wherein the calibration phantom is within the field of view of the video camera such that the crosshair center is aligned with the center mark within the GUI;
    determining a calibration ratio defined as a physical distance per pixel within the sequence of images when the moveable stage is at the first location;
    receiving the physical location of the vertex mark;
    moving the moveable stage from the first position to a second position by moving the first offset distance in the first direction and moving the second offset distance in the second direction;
    measuring, at the second location, respective first pixel differences in the first and second directions between a pixel location of the predetermined vertex mark within the GUI and a pixel location of the crosshair center within the GUI; and
    outputting a calibration status based upon a comparison between the first pixel differences in the first and second directions and a threshold value.

2. The method of claim 1, wherein determining the calibration ratio comprises:
    receiving a physical length of a predetermined side of one of the first and second polygons;
    measuring a number pixels over which the predetermined side extends within the GUI; and
    taking the ratio of the physical length of the predetermined side and the measured number of pixels.

3. The method of claim 1, further comprising annunciating a first notification representing a successful calibration status when the first pixel differences are each less than or equal to the threshold value.

4. The method of claim 1, wherein the optical axis of the field of view of the video camera approximately intersects the pixel location of the crosshair within the GUI when the first pixel differences are each less than or equal to the threshold value.

5. The method of claim 4, further comprising:
removing the calibration phantom from the movable stage;
mounting a target object to the moveable stage;
moving the movable stage such that at least a portion of the target object is within the field of view of the video camera;
receiving, within the GUI, a user selection of an inspection location within the field of view that is on the target object;
measuring respective second pixel differences in the first and second directions between a pixel location of the inspection location within the GUI and a pixel location of the crosshair center within the GUI;
determining a first physical offset distance in the first and second directions between the selected inspection location and the optical axis of the video camera based upon the second pixel differences and the calibration ratio;
receiving a second physical offset distance in the first and second directions between the optical axis of the video camera and a beam axis of an x-ray beam emitted by an x-ray source positioned adjacent to the video camera; and
moving the movable stage to a third position based upon the first and second physical offset distances, wherein the beam axis of the x-ray source intersects the selected inspection location on the target object in the third position.

6. The method of claim 1, further comprising annunciating a second notification representing a failed calibration status when at least one of the first pixel differences is greater than the threshold value.

7. The method of claim 1, wherein the optical axis of the field of view of the video camera does not intersect the pixel location of the crosshair within the GUI when at least one of the first pixel differences is greater than the threshold value.

8. The method of claim 1, further comprising determining respective correction factors in the first and second directions when the first pixel differences are greater than the threshold value, wherein the correction factors are respective fourth pixel differences in the first and second directions between the pixel location of the crosshair center and the pixel location of the vertex mark.

9. The method of claim 8, further comprising:
removing the calibration phantom from the movable stage;
mounting a target object to the moveable stage;
moving the movable stage to a position such that at least a portion of the target object is within the field of view of the video camera;
receiving, within the GUI, a user selection of an inspection location within the field of view that is on the target object;
measuring respective second pixel differences in the first and second directions between a pixel location of the inspection location within the GUI and a pixel location of the crosshair center within the GUI;
determining a first physical offset distance in the first and second directions between the selected inspection location and the optical axis of the video camera based upon the second pixel differences and the calibration ratio;
receiving a second physical offset distance in the first and second directions between the optical axis of the video camera and a beam axis of an x-ray beam emitted by an x-ray source positioned adjacent to the video camera;
receiving the correction factors in the first and second directions;
moving the movable stage to a third position based upon the first and second physical offset distances and the correction factors, wherein the location of the beam axis of the x-ray source intersects the selected location on the target object.

10. A computer program product comprising a non-transitory machine-readable medium storing instructions that, when executed by at least one programmable processor, cause the at least one programmable processor to perform operations comprising:
generating a graphical user interface (GUI) including a sequence of images of a field of view of an optical video camera and a crosshair overlaid upon the sequence of images;
outputting the GUI for display;
moving the moveable stage to a first location, wherein a calibration phantom is within the field of view of the video camera, wherein a first surface of the calibration phantom is generally planar and includes an optically visible pattern illustrated thereon, the pattern including:
a plurality of polygons of different sizes, wherein a first polygon of the plurality of polygons is inset and centered within a second polygon of the plurality of polygons;
a center mark at a center of the calibration phantom; and
a vertex mark at a vertex of one of the plurality of polygons;
wherein a physical location of the vertex mark is offset from a physical location of the center mark by a predetermined first offset distance in a first direction and a predetermined second offset distance in a second direction, and wherein the first and second directions lie in the plane of the first surface and are orthogonal to one another;
wherein the crosshair center is aligned with the center mark within the GUI at the first position;
determining a calibration ratio defined as a physical distance per pixel within the sequence of images when the moveable stage is at the first location;
receiving the physical location of the vertex mark;
moving the moveable stage from the first position to a second position by moving the first offset distance in the first direction and moving the second offset distance in the second direction;
measuring, at the second location, respective first pixel differences in the first and second directions between a pixel location of the predetermined vertex mark within the GUI and a pixel location of the crosshair center within the GUI; and
outputting a calibration status based upon a comparison between the first pixel differences in the first and second directions and a threshold value.

11. The computer program product of claim 10, wherein determining the calibration ratio comprises:
receiving a physical length of a predetermined side of one of the first and second polygons;

measuring a number pixels over which the predetermined side extends within the GUI; and taking the ratio of the physical length of the predetermined side and the measured number of pixels.

12. The computer program product of claim 10, wherein the at least one programmable processor is further configured to perform operations comprising annunciating a first notification representing a successful calibration status when the first pixel differences are each less than or equal to the threshold value.

13. The computer program product of claim 10, wherein the optical axis of the field of view of the video camera approximately intersects the pixel location of the crosshair within the GUI when the first pixel differences are each less than or equal to the threshold value.

14. The computer program product of claim 13, wherein the at least one programmable processor is further configured to perform operations comprising:

moving the movable stage after calibration phantom is removed from the moveable stage and a target object is mounted to the moveable stage, wherein the moveable stage is moved to a position such that at least a portion of the target object to be within the field of view of the video camera;

receiving, within the GUI, a user selection of an inspection location within the field of view that is on the target object;

measuring respective second pixel differences in the first and second directions between a pixel location of the inspection location within the GUI and a pixel location of the crosshair center within the GUI;

determining a first physical offset distance in the first and second directions between the selected inspection location and the optical axis of the video camera based upon the second pixel differences and the calibration ratio;

receiving a second physical offset distance in the first and second directions between the optical axis of the video camera and a beam axis of an x-ray beam emitted by an x-ray source positioned adjacent to the video camera; and moving the movable stage to a third position based upon the first and second physical offset distances, wherein the beam axis of the x-ray source intersects the selected inspection location on the target object in the third position.

15. The computer program product of claim 10, wherein the at least one programmable processor is further configured to perform operations comprising annunciating a second notification representing a failed calibration status when at least one of the first pixel differences is greater than the threshold value.

16. The computer program product of claim 10, wherein the optical axis of the field of view of the video camera does not intersect the pixel location of the crosshair within the GUI when at least one of the first pixel differences is greater than the threshold value.

17. The computer program product of claim 10, wherein the at least one programmable processor is further configured to perform operations comprising determining respective correction factors in the first and second directions when the first pixel differences are greater than the threshold value, wherein the correction factors are respective fourth pixel differences in the first and second directions between the pixel location of the crosshair center and the pixel location of the vertex mark.

18. The computer program product of claim 17, wherein the at least one programmable processor is further configured to perform operations comprising:

moving the movable stage after the calibration phantom is removed from the moveable stage and a target object is mounted to the moveable stage, wherein the moveable stage is moved to a position such that at least a portion of the target object is within the field of view of the video camera;

receiving, within the GUI, a user selection of an inspection location within the field of view that is on the target object;

measuring respective second pixel differences in the first and second directions between a pixel location of the inspection location within the GUI and a pixel location of the crosshair center within the GUI;

determining a first physical offset distance in the first and second directions between the selected inspection location and the optical axis of the video camera based upon the second pixel differences and the calibration ratio;

receiving a second physical offset distance in the first and second directions between the optical axis of the video camera and a beam axis of an x-ray beam emitted by an x-ray source positioned adjacent to the video camera;

receiving the correction factors in the first and second directions;

moving the movable stage to a third position based upon the first and second physical offset distances and the correction factors, wherein the location of the beam axis of the x-ray source intersects the selected location on the target object.

* * * * *